US012647924B2

(12) United States Patent
Fan

(10) Patent No.: US 12,647,924 B2
(45) Date of Patent: Jun. 2, 2026

(54) INFORMATION CONFIGURATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 361 days.

(21) Appl. No.: 18/456,925

(22) Filed: Aug. 28, 2023

(65) Prior Publication Data

US 2023/0422199 A1     Dec. 28, 2023

Related U.S. Application Data

(63) Continuation of application No. PCT/CN2021/078879, filed on Mar. 3, 2021.

(51) Int. Cl.
H04W 64/00          (2009.01)
H04W 60/04          (2009.01)

(52) U.S. Cl.
CPC ........... H04W 60/04 (2013.01); H04W 64/00 (2013.01)

(58) Field of Classification Search
CPC ..... H04W 60/04; H04W 64/00; H04W 48/12; H04W 36/0061; H04W 48/16
See application file for complete search history.

(56) References Cited

U.S. PATENT DOCUMENTS

| 2015/0373770 | A1* | 12/2015 | Niemi | H04W 76/18 |
| | | | | 370/329 |
| 2017/0171805 | A1* | 6/2017 | Kaura | H04W 48/18 |
| 2018/0035355 | A1* | 2/2018 | Gong | H04W 64/006 |
| 2018/0041935 | A1* | 2/2018 | Jung | H04W 48/18 |
| 2020/0221369 | A1* | 7/2020 | Adjakple | H04W 48/08 |
| 2021/0120481 | A1* | 4/2021 | Cheng | H04W 24/02 |

(Continued)

FOREIGN PATENT DOCUMENTS

| CN | 1802025 | 7/2006 |
| CN | 101795477 | 8/2010 |
| CN | 102892129 | 1/2013 |

(Continued)

OTHER PUBLICATIONS

3GPP TS 23.502 Procedures for the 5G System (5GS) (version 16.7.1 Release 16) (Year: 2021).*

(Continued)

*Primary Examiner* — Moo Jeong
*Assistant Examiner* — David Zhijun Sun
(74) *Attorney, Agent, or Firm* — Hodgson Russ LLP

(57) ABSTRACT

An information configuration method is provided. The method includes the following. Receive network configuration information sent by a core-network device, where the network configuration information includes validity configuration information, and the validity configuration information indicates a validity condition of a second communication network equivalent to a first communication network registered by a terminal device. A network device and a terminal device are provided.

20 Claims, 5 Drawing Sheets

(56) References Cited

U.S. PATENT DOCUMENTS

2022/0014904 A1* 1/2022 Lauster ................ H04L 61/256

FOREIGN PATENT DOCUMENTS

| | | |
|---|---|---|
| CN | 102917420 | 2/2013 |
| CN | 103037463 | 4/2013 |
| CN | 111133800 | 5/2020 |

OTHER PUBLICATIONS

"3rd Generation Partnership Project; Technical Specification Group Radio Access Network; NR; Radio Resource Control (RRC) protocol specification (Release 16)," 3GPP TS 38.331, Jan. 2021, v16.3.1.

"3rd Generation Partnership Project; Technical Specification Group Radio Access Network; NR; User Equipment (UE) procedures in Idle mode and RRC Inactive state (Release 16)," 3GPP TS 38.304, Dec. 2020, v16.3.0.

"3rd Generation Partnership Project; Technical Specification Group Services and System Aspects; Procedures for the 5G System (5GS); Stage 2 (Release 16)," 3GPP TS 23.502, Jan. 2021, v16.7.1.

"3rd Generation Partnership Project; Technical Specification Group Core Network and Terminals; Non-Access-Stratum (NAS) functions related to Mobile Station (MS) in idle mode (Release 17)," 3GPP TS 23.122, Jan. 2021, v17.1.1.

WIPO, International Search Report and Written Opinion for International Application No. PCT/CN2021/078879, Jul. 29, 2021.

* cited by examiner

INFORMATION CONFIGURATION METHOD, TERMINAL DEVICE, AND NETWORK DEVICE

CROSS-REFERENCE TO RELATED APPLICATION(S)

This application is a continuation of International Application No. PCT/CN2021/078879, filed Mar. 3, 2021, the entire disclosure of which is incorporated herein by reference.

TECHNICAL FIELD

This disclosure relates to the field of mobile communication, and more particularly to an information configuration method, a terminal device, and a network device.

BACKGROUND

With rapid development of mobile communication networks, communication networks provided by different operators have different resources. Currently, a communication network sharing method is provided, so that resources of communication networks of different operators can be shared.

With regard to a first communication network and a second communication network that belong to different operators, if the first communication network and the second communication network are in a network sharing state, the first communication network and the second communication network are equivalent to each other, and resources of the two communication networks can be shared. If one of the two communication networks is accessed by a terminal device, the terminal device can access the other one of the two communication networks without re-registration. However, the terminal device can hand over between communication networks that are equivalent to each other, and permission is excessively high.

SUMMARY

In an aspect of the disclosure, an information configuration method is provided. The method is applied to a terminal device. The method includes the following. Receive network configuration information sent by a core-network device, where the network configuration information includes validity configuration information, and the validity configuration information indicates a validity condition of a second communication network equivalent to a first communication network registered by the terminal device.

In an aspect of the disclosure, an information configuration method is provided. The method is applied to a core-network device. The method includes the following. Send network configuration information to a terminal device, where the network configuration information includes validity configuration information, and the validity configuration information indicates a validity condition of a second communication network equivalent to a first communication network registered by the terminal device.

In an aspect of the disclosure, a terminal device is provided. The terminal device includes a processor, a transceiver, and a memory. The transceiver is coupled with the processor. The memory is configured to store executable program codes of the processor. The processor is configured to load and execute the executable program codes to implement the method described in the foregoing aspect.

In an aspect of the disclosure, a core-network device is provided. The core-network device includes a processor, a transceiver, and a memory. The transceiver is coupled with the processor. The memory is configured to store executable program codes of the processor. The processor is configured to load and execute the executable program codes to implement the method described in the foregoing aspects.

BRIEF DESCRIPTION OF THE DRAWINGS

In order to describe more clearly technical solutions of implementations of the disclosure, the following will give a brief introduction to the accompanying drawings used for describing the implementations. Apparently, the accompanying drawings described below are merely some implementations of the disclosure. Based on these drawings, those of ordinary skill in the art can also obtain other drawings without creative effort.

DETAILED DESCRIPTION

In order to make purposes, technical solutions, and advantages of the disclosure clearer, implementations of the disclosure will be described in further detail below with reference to the accompanying drawings.

It can be understood that, the terms "first", "second", and the like used herein may be used to describe various concepts, but these concepts are not limited by these terms unless otherwise stated. These terms are only used to distinguish one concept from another.

Figure 1:
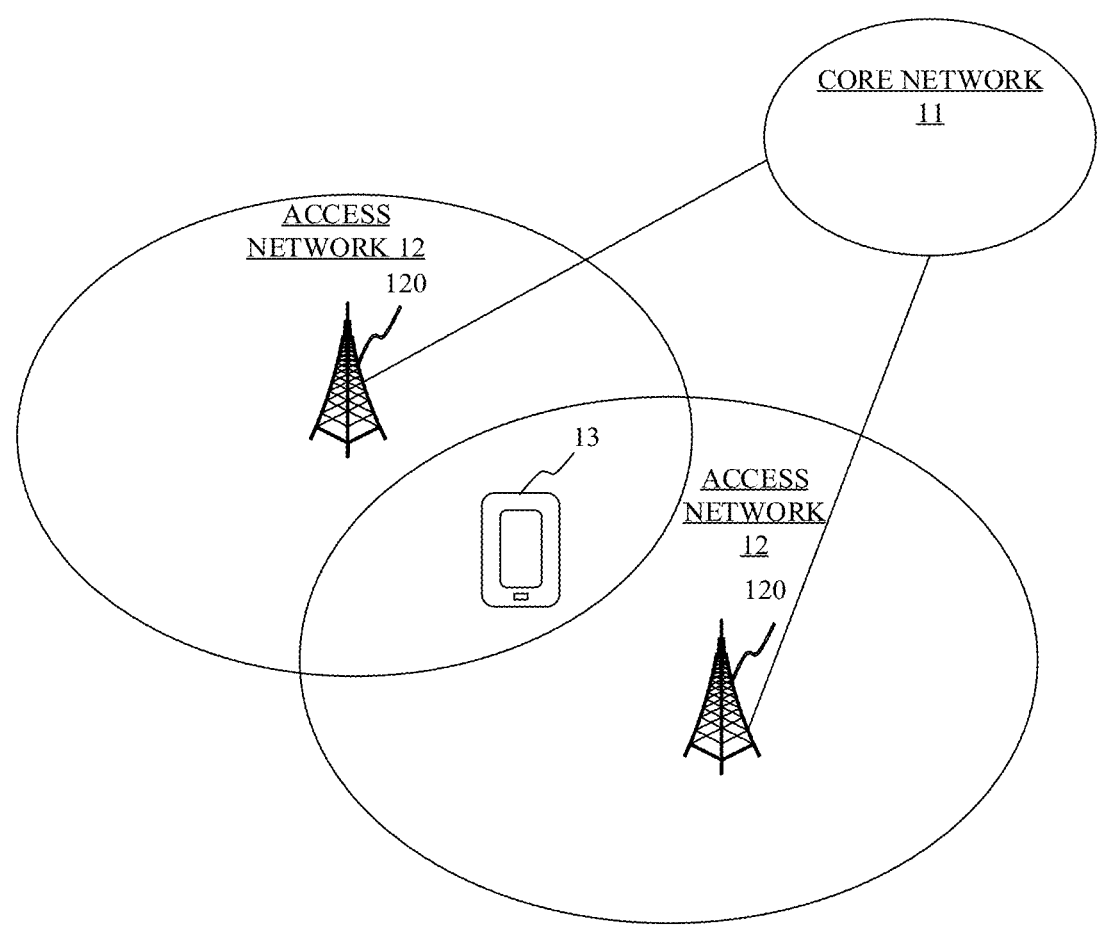
FIG. 1 is a block diagram of a communication system provided in an exemplary implementation of the disclosure.

FIG. 1 is a block diagram of a communication system provided in an exemplary implementation of the disclosure. The communication system may include: a core network 11, an access network 12, and a terminal device 13.

The core network 11 is responsible for functions that are independent of radio access but are required for providing a complete network. The functions mainly include authentication, charging functions, and end-to-end settings. Network elements responsible for various functions of the core network are collectively called "core-network device", such as an access and mobility management function (AMF), a session management function (SMF), or other network elements.

The access network 12 includes several network devices 120. The network device 120 may be a base station. The base station is a device deployed in the access network to provide wireless communication functions for the terminal device. The base station may include macro base stations, micro base stations, relay stations, access points, and the like in various forms. In systems adopting different radio access technologies, devices with base station functions may have different names. For example, in a long-term evolution (LTE) system, such device is referred to as eNodeB or eNB. In a fifth generation (5G) new radio (NR) system, such device is referred to as gNodeB or gNB. The name "base station" may change with evolution of communication technologies. For the convenience of illustration, in implementations of the disclosure, devices that provide wireless communication functions for the terminal device 13 are collectively referred to as "access-network device".

The terminal device 13 in implementations of the disclosure may include various handheld devices, in-vehicle devices, wearable devices, computing devices with wireless communication functions, or other processing devices connected to a wireless modem, as well as user equipment (UE), mobile stations (MS), terminal devices, and the like in various forms. For the convenience of illustration, in implementations of the disclosure, such devices are collectively referred to as "terminal device". The access-network device 120 and the terminal device 13 communicate with each other by using some air interface technology, such as a UE-universal mobile telecommunication system (UMTS) terrestrial radio access network (UE-UTRAN, Uu) interface.

Technical solutions of implementations of the disclosure are applicable to various communication systems, for example, a global system of mobile communication (GSM), a code division multiple access (CDMA) system, a wideband code division multiple access (WCDMA) system, a general packet radio service (GPRS), an LTE system, an LTE frequency division duplex (FDD) system, an LTE time division duplex (TDD) system, an advanced LTE (LTE-A) system, an NR system, an evolved system of an NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area network (WLAN), a wireless fidelity (WiFi), a next-generation communication system, or other communication systems, etc.

Generally speaking, a conventional communication system generally supports a limited quantity of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, or vehicle to everything (V2X) communication, etc. Implementations of the disclosure can also be applied to these communication systems.

Implementations of the disclosure provide an information configuration method and apparatus, a device, and a storage medium. As such, it is possible to prevent random handover of a terminal between equivalent communication networks, thereby restricting permission of the terminal, expanding a sharing mode of communication networks, and on the other hand, improving flexibility of network sharing. Technical solutions are as follows.

Figure 2:
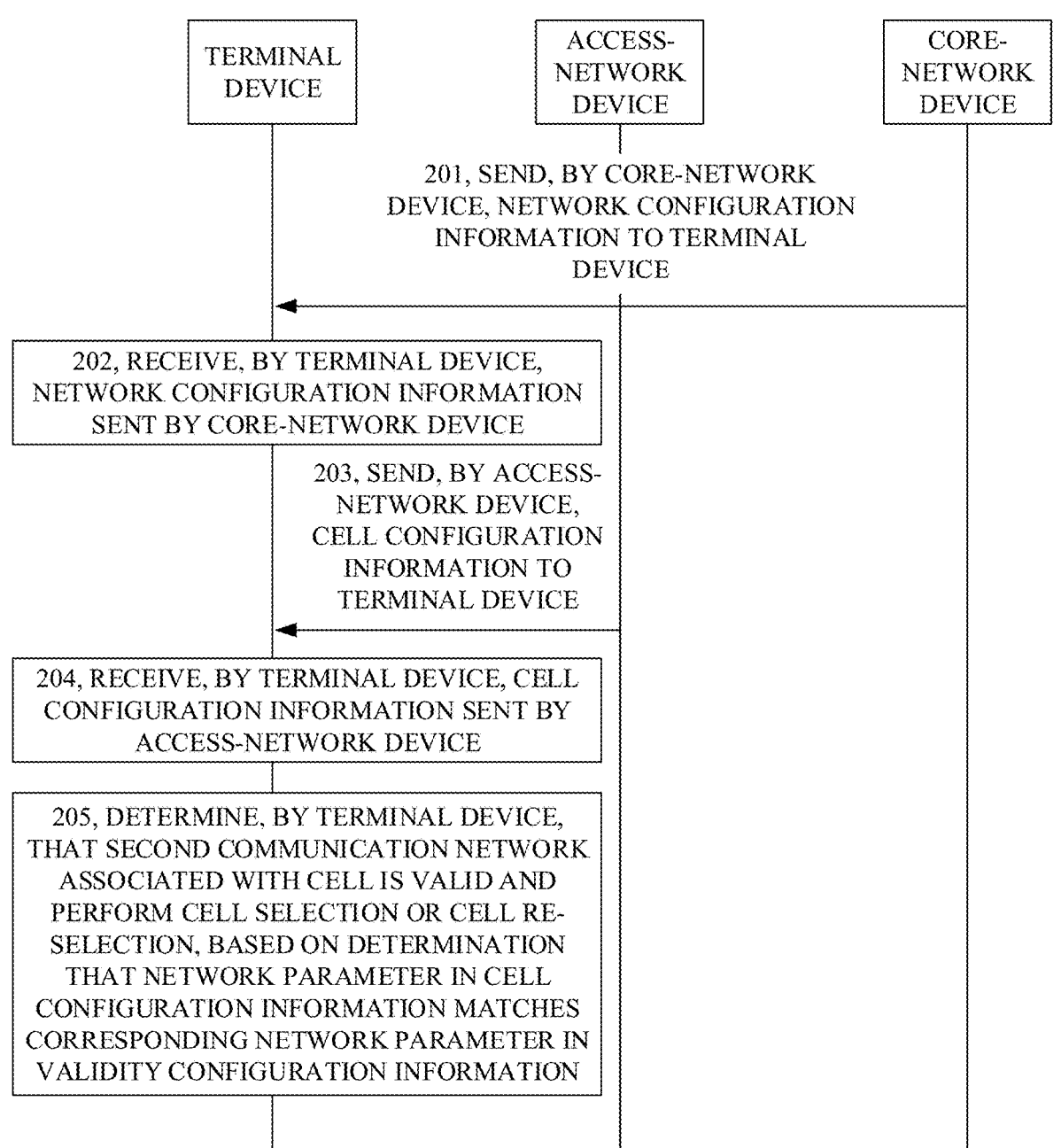
FIG. 2 is a flowchart of an information configuration method provided in an exemplary implementation of the disclosure.

FIG. 2 is a flowchart of an information configuration method provided in an exemplary implementation of the disclosure. The method is applied to a core-network device, an access-network device, and a terminal device illustrated in FIG. 1. The method includes at least some of the following.

201, the core-network device sends network configuration information to the terminal device.

202, the terminal device receives the network configuration information sent by the core-network device.

The network configuration information includes validity configuration information, where the validity configuration information indicates a validity condition of a second communication network equivalent to a first communication network registered by the terminal device.

As such, it is possible to prevent random handover of the terminal between equivalent communication networks, thereby restricting permission of the terminal, expanding a sharing mode of communication networks, and on the other hand, improving flexibility of network sharing.

In implementations of the disclosure, the core-network device is responsible for multiple communication networks, and network sharing can be achieved among the multiple communication networks. In this case, the multiple communication networks are equivalent communication networks to each other. In order to restrict random access of the terminal device to these communication networks, the core-network device configures for the terminal device the validity configuration information in the network configuration information, so that the terminal device can determine, according to the validity configuration information, the validity condition of the second communication network equivalent to the first communication network registered by the terminal device, thereby determining whether a cell that the second communication network belongs to can be accessed.

It should be noted that, in implementations of the disclosure, when sending the network configuration information to the terminal device, the core-network device firstly sends the network configuration information to an access-network device, and then the access-network device transparently passes through the network configuration information to the terminal device, thus completing sending the network configuration information.

In some implementations, the network configuration information further includes an identity (ID) of the first communication network registered by the terminal device. After the terminal device completes registration on the first communication network, the core-network device also obtains registration information of the terminal device. When sending the network configuration information to the terminal device, the core-network device further carries, in the network configuration information, the ID of the first communication network registered by the terminal device.

In some other implementations, the network configuration information further includes a list of equivalent communication networks associated with the first communication network, where the list of equivalent communication networks includes an ID(s) of the second communication network(s) equivalent to the first communication network.

In implementations of the disclosure, the core-network device further stores the second communication network that has achieved resource sharing with the first communication network. When sending the network configuration information to the terminal device, the core-network device further carries, in the network configuration information, the list of equivalent communication networks associated with the first communication network. After receiving the list of equivalent communication networks, the terminal device determines the second communication network equivalent to the first communication network according to the ID of the second communication network equivalent to the first communication network included in the list of equivalent communication networks.

In some implementations, the validity configuration information includes at least one of the following:

(1) Frequency-band ID information.

The frequency-band ID information at least includes one frequency-band ID, and the frequency-band ID is indicative of a frequency band. For example, a communication network has five frequency bands, where frequency-band ID 1 is representative of frequency band A, frequency-band ID 2 is representative of frequency band B, frequency-band ID 3 is representative of frequency band C, frequency-band ID 4 is representative of frequency band D, and frequency-band ID 5 is representative of frequency band E.

(2) Tracking area identity (TAI).

The TAI at least includes one TAI identifier. The TAI identifier is identified by a public land mobile network (PLMN) ID and a tracking area code (TAC) ID, or is identified by a stand-alone non-public network (SNPN) ID and a TAC ID.

(3) Frequency-point ID.

The frequency-point ID information at least includes one frequency-point ID, where the frequency-point ID is used for numbering fixed frequencies. For example, five frequencies, 890 megahertz (MHz), 890.2 MHz, 890.4 MHz, 890.6 MHz, and 890.8 MHz, are numbered to obtain number (No.) 1, number 2, number 3, number 4, and number 5. As can be seen, each number is one frequency-point ID.

(4) Cell global identity (CGI).

The CGI at least includes one CGI identifier. The CGI identifier is identified by a PLMN ID and a cell ID, or is identified by an SNPN ID and a cell ID.

(5) Geographic region information. The geographic region information is indicative of at least one geographic region.

In some implementations, the geographic region information is geographic coordinates, such as latitude-longitude coordinates or other coordinates.

In some other implementations, the geographic region information is a location ID, where the location ID indicates a geographic region. For example, the globe is divided into multiple geographic regions, where each geographic region corresponds to one location ID. After the location ID is known, a geographic region corresponding to the location ID can be determined.

(6) Radio access technology (RAT) information.

The RAT information is indicative of at least one RAT type. By way of example rather than limitation, an RAT may include but is not limited to at least one of: a $3^{rd}$ generation (3G) RAT (e. g., CDMA), a $4^{th}$ generation (4G) RAT (e. g., LTE or LTE-A), or a 5G RAT (e. g., NR).

(7) Core-network type information.

A core-network type includes any one of: supporting connection to an LTE core network (evolved packet core (EPC)) only, supporting connection to a 5G core network (5G core (5GC)) only, or supporting both connection to an EPC and connection to a 5GC. In other words, a base station supports EPC connection only, or supports 5GC connection only, or supports both EPC connection and 5GC connection.

Since the validity configuration information specifies the validity condition of the second communication network equivalent to the first communication network, if a network parameter associated with the second communication network matches a network parameter in the validity configuration information, it is determined that the second communication network is valid, and the terminal device can access a cell associated with the second communication network.

In some implementations, the validity configuration information is maintained by a non-access stratum (NAS), or the validity configuration information is maintained by an access stratum (AS) and the NAS.

After receiving the validity configuration information, the terminal device maintains the validity configuration information at an NAS of the terminal device, or the terminal device maintains the validity configuration information at an AS and the NAS of the terminal device.

In a possible implementation, if the validity configuration information includes the geographic region information, the AS of the terminal device obtains current geographic location information of the terminal device; and the AS of the terminal device transfers the geographic location information to the NAS of the terminal device, and the NAS of the terminal device determines whether the geographic location information is within a geographic region indicated by the geographic region information.

In some implementations, the terminal device obtains positioning information based on a global navigation satellite system (GNSS), or obtains the positioning information based on a non-GNSS, and the disclosure is not limited in this regard.

In some implementations, the terminal device queries a location ID list according to the geographic location information, and determines a location ID corresponding to a geographic region that the geographic location information belongs to, where the location ID list includes a correspondence between location IDs and geographic regions. The location ID is transferred to the NAS.

It should be noted that, in implementations of the disclosure, the core-network device exemplarily sends the network configuration information to the terminal device. In another implementation, the network configuration information is contained in a registration response message or a configuration update message. The registration response message is a response message replied by the core-network device in response to a registration request message sent by the terminal device, and the configuration update message is used for the core-network device to update a configuration of the terminal device.

In some implementations, if the first communication network is a PLMN, the second communication network is a PLMN or an SNPN. Alternatively, if the first communication network is an SNPN, the second communication network is a PLMN or an SNPN.

203, the access-network device sends cell configuration information to the terminal device.

204, the terminal device receives the cell configuration information sent by the access-network device.

The cell configuration information is configuration information of a cell that is found or camped on by the terminal device.

In implementations of the disclosure, the access-network device sends the cell configuration information to the terminal device. Then the terminal device determines, according to the cell configuration information received, whether a communication network associated with a cell corresponding to the cell configuration information is valid, and performs cell selection or cell re-selection based on determination that the communication network is valid.

In some implementations, the cell configuration information is contained in dedicated signaling or a system broadcast message. The access-network device sends the dedicated signaling to the terminal device, and the terminal device receives the dedicated signaling sent by the access-network device. Alternatively, the access-network device sends the system broadcast message, and the terminal device receives the system broadcast message sent by the access-network device.

In some implementations, the cell configuration information includes at least one of: (1) frequency-band ID information, (2) a TAI, (3) frequency-point ID information, (4) a CGI, (5) geographic region information, (6) RAT information, or (7) core-network type information.

The meaning of a network parameter in the cell configuration information is similar to the meaning of a network parameter in the validity configuration information described above, and thus will not be described again herein.

In some other implementations, the AS of the terminal device receives the cell configuration information sent by the access-network device, and transfers the cell configuration information to the NAS of the terminal device.

In implementations of the disclosure, the AS of the terminal device receives the cell configuration information sent by the access-network device, and the NAS of the terminal device determines, according to the cell configuration information, whether the corresponding second communication network is valid. The AS of the terminal device receives the cell configuration information sent by the access-network device, and then transfers the cell configuration information to the NAS of the terminal.

It should be noted that, in implementations of the disclosure, steps 203204 are exemplarily performed after steps 201202. In another implementation, steps 203204 may also be performed before steps 201202. There is no limitation on the execution order between steps 201202 and steps 203204 in implementations of the disclosure.

205, the terminal device determines that the second communication network associated with the cell is valid and performs cell selection or cell re-selection, based on determination that a network parameter in the cell configuration information matches a corresponding network parameter in the validity configuration information.

In implementations of the disclosure, the terminal device receives the cell configuration information sent by the cell that is found or camped on, and then determines whether the network parameter in the cell configuration information matches the corresponding network parameter in the validity configuration information. If the two parameters match, it indicates that the second communication network associated with the cell corresponding to the cell configuration information is valid, and the terminal device can perform cell selection or cell re-selection onto the cell.

In some implementations, the terminal determining that the network parameter in the cell configuration information matches the corresponding network parameter in the validity configuration information includes at least one of the following.

(1) Determine that the network parameter in the cell configuration information matches the corresponding network parameter in the validity configuration information, if frequency-band ID information in the cell configuration information is the same as at least one piece of frequency-band ID information in the validity configuration information.

For example, if a frequency-band ID in the cell configuration information is ID 1 and the frequency-band ID information in the validity configuration information includes ID 1, it is determined that the network parameter in the cell configuration information matches the corresponding network parameter in the validity configuration information.

(2) Determine that the network parameter in the cell configuration information matches the corresponding network parameter in the validity configuration information, if a TAI associated with the second communication network in the cell configuration information is the same as at least one TAI associated with the second communication network in the validity configuration information.

For example, the validity configuration information includes TAI 1 and TAI 2 associated with PLMN 2. If the cell configuration information includes PLMN 2 and PLMN 2 is associated with TAI 2, it indicates that the network parameter in the cell configuration information matches the corresponding network parameter in the validity configuration information. If the cell configuration information includes PLMN 2 and PLMN 2 is associated with TAI 3, it indicates that the network parameter in the cell configuration information does not match the corresponding network parameter in the validity configuration information.

(3) Determine that the network parameter in the cell configuration information matches the corresponding network parameter in the validity configuration information, if frequency-point ID information in the cell configuration information is the same as at least one piece of frequency-point ID information in the validity configuration information.

For example, if the frequency-point ID information in the cell configuration information is number 1, and the frequency-point ID information in the validity configuration information includes number 1, it is determined that the network parameter in the cell configuration information matches the corresponding network parameter in the validity configuration information.

(4) Determine that the network parameter in the cell configuration information matches the corresponding network parameter in the validity configuration information, if a CGI associated with the second communication network in the cell configuration information is the same as at least one CGI associated with the second communication network in the validity configuration information.

For example, the validity configuration information includes CGI 1 and CGI 2 associated with PLMN 2. If the cell configuration information includes PLMN 2 and PLMN 2 is associated with CGI 2, it indicates that the network parameter in the cell configuration information matches the corresponding network parameter in the validity configuration information. If the cell configuration information includes PLMN 2 and PLMN 2 is associated with CGI 3, it indicates that the network parameter in the cell configuration information does not match the corresponding network parameter in the validity configuration information.

(5) Determine that the network parameter in the cell configuration information matches the corresponding network parameter in the validity configuration information, if RAT information in the cell configuration information or derived from the cell configuration information is the same as RAT information in the validity configuration information.

For example, the validity configuration information includes RAT 1 and RAT 2 associated with PLMN 2. If the cell configuration information includes PLMN 2 and PLMN 2 is associated with RAT 2, it indicates that the network parameter in the cell configuration information matches the corresponding network parameter in the validity configuration information. If the cell configuration information includes PLMN 2 and PLMN 2 is associated with RAT 3, it indicates that the network parameter in the cell configuration information does not match the corresponding network parameter in the validity configuration information.

(6) Determine that the network parameter in the cell configuration information matches the corresponding network parameter in the validity configuration information, if core-network type information in the cell configuration information or derived from the cell configuration information is the same as core-network type information in the validity configuration information.

For example, the validity configuration information includes an EPC and a 5GC associated with PLMN 2. If the cell configuration information includes PLMN 2 and PLMN 2 is associated with the 5GC, it indicates that the network parameter in the cell configuration information matches the corresponding network parameter in the validity configuration information. If the cell configuration information includes PLMN 2 and PLMN 2 is associated with a 3G core-network type, it indicates that the network parameter in the cell configuration information does not match the corresponding network parameter in the validity configuration information.

The first point to be explained is that in implementations of the disclosure, whether the second communication network is valid is determined exemplarily according to whether the cell configuration information matches the validity configuration information. In another implementation, if the validity configuration information includes geographic region information, the terminal device will determine, according to a region indicated by current geographic location information of the terminal device, whether it is within a geographic region indicated by the geographic region information in the validity configuration information, thereby determining whether the second communication network is valid.

The second point to be explained is that in implementations of the disclosure, the terminal device controls to perform cell selection or cell re-selection exemplarily based on determination that the cell configuration information matches the validity configuration information. In another implementation, the terminal device is in an idle state or an inactive state, and needs to select a cell to camp on. If it is determined that the cell configuration information received matches the validity configuration information, it indicates that a cell associated with the cell configuration information received by the terminal device satisfies access requirements, and the terminal device can perform cell selection or cell re-selection.

Implementations of the disclosure provide a method for configuring validity information of the second communication network equivalent to the first communication network registered. The terminal determines, according to the validity information configured by the core-network device, whether the second communication network equivalent to the first communication network is valid. As such, it is possible to prevent random handover of the terminal between equivalent communication networks, thereby restricting permission of the terminal, expanding a sharing mode of communication networks, and on the other hand, improving flexibility of network sharing.

Figure 3:
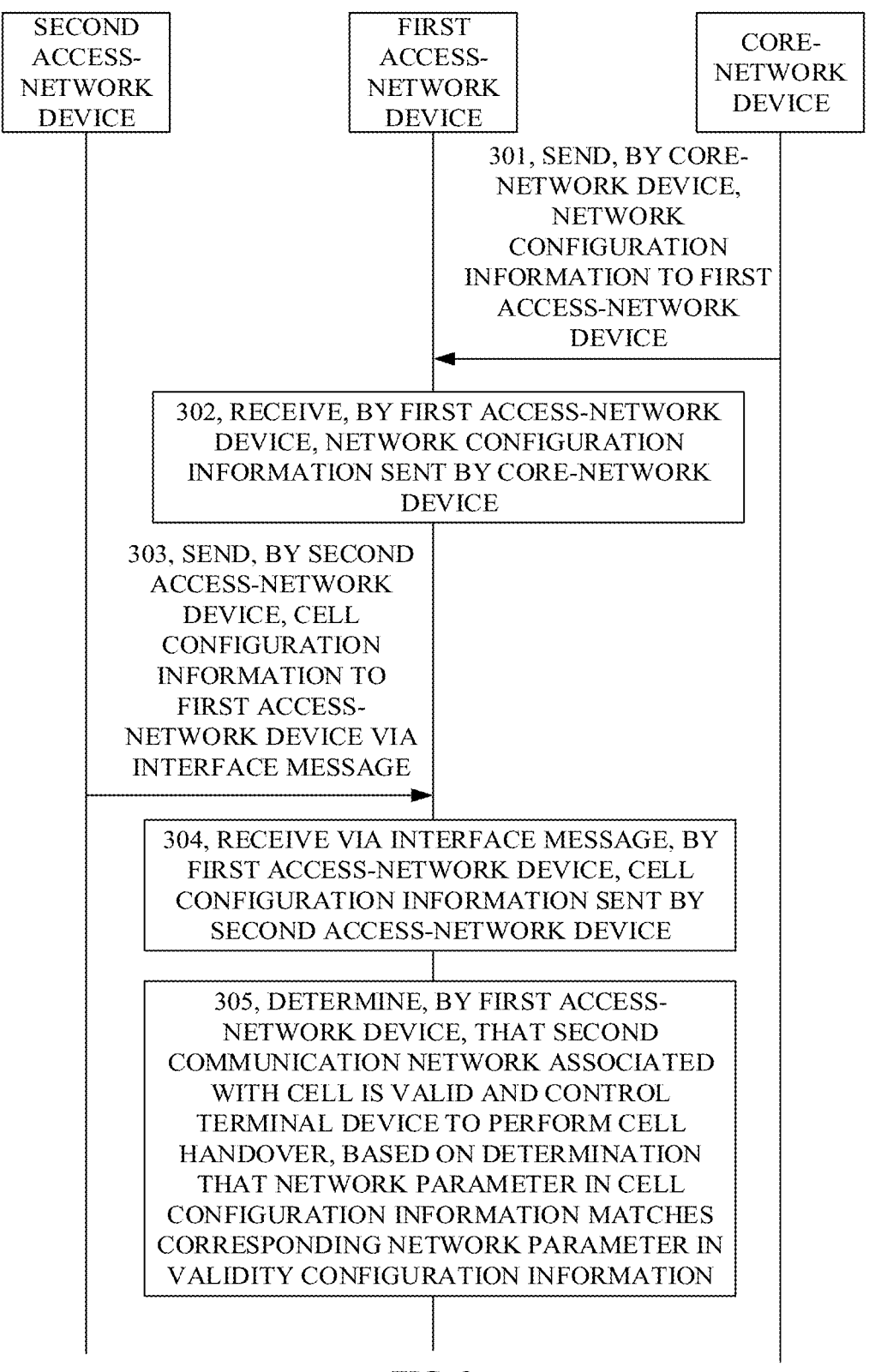
FIG. 3 is a flowchart of an information configuration method provided in an exemplary implementation of the disclosure.

Implementations in FIG. 2 illustrate how the terminal determines, according to the cell configuration information and the validity configuration information received, whether to perform cell selection or cell re-selection. For the access-network device, the access-network device can also determine, according to cell configuration information of other access-network devices and the validity configuration information, whether to control the terminal to perform cell handover. For example, FIG. 3 is a flowchart of an information configuration method provided in an exemplary implementation of the disclosure. The method is applied to a core-network device, a first access-network device, and a terminal device illustrated in FIG. 1. The method includes at least some of the following.

301, the core-network device sends network configuration information to the first access-network device.

302, the first access-network device receives the network configuration information sent by the core-network device.

The network configuration information includes validity configuration information, where the validity configuration information indicates a validity condition of a second communication network equivalent to a first communication network registered by a terminal device.

In some implementations, the network configuration information further includes an ID of the first communication network registered by the terminal device.

In some implementations, the network configuration information further includes a list of equivalent communication networks associated with the first communication network, where the list of equivalent communication networks includes an ID of the second communication network equivalent to the first communication network.

In some implementations, the validity configuration information includes at least one of: (1) frequency-band ID information, (2) a TAI, (3) frequency-point ID information, (4) a CGI, (5) geographic region information, (6) RAT information, or (7) core-network type information.

Steps 301~302 are similar to steps 201~202 described above, and thus will not be described again herein.

In some implementations, the access-network device obtains current geographic location information of the terminal device, and determines whether the geographic location information is within a geographic region indicated by the geographic region information.

In a possible implementation, the terminal device obtains the current geographic location information of the terminal device, and sends the geographic location information to the access-network device. The access-network device receives the geographic location information sent by the terminal device, thereby completing obtaining the current geographic location information of the terminal device.

In another possible implementation, the access-network device directly locates the terminal device based on information transmission between the access-network device and the terminal device, thereby obtaining the current geographic location information of the terminal device.

In another possible implementation, the access-network device directly obtains positioning information of the terminal device from a positioning server, thereby obtaining the current geographic location information of the terminal device.

303, a second access-network device sends cell configuration information to the first access-network device via an interface message.

304, the first access-network device receives, via the interface message, the cell configuration information sent by the second access-network device.

In some implementations, the cell configuration information includes at least one of: (1) frequency-band ID information, (2) a TAI, (3) frequency-point ID information, (4) a CGI, (5) geographic region information, (6) RAT information, or (7) core-network type information.

In some other implementations, the interface message is carried in at least one of: X2 interface, Xn interface, S1 interface, NG interface, F1 interface, or E1 interface.

X2 interface is a communication interface between 4G RAN nodes.

Xn interface is a communication interface between 5G RAN nodes.

S1 interface is a communication interface between a 4G RAN node and a 4G core network.

NG interface is a communication interface between a 5G RAN node and a 5G core network.

F1 interface is a communication interface between a gNB-central unit (CU) and a gNB-distributed unit (DU) of a RAN node using NR technology.

E1 interface is a communication interface between a gNB-CU-control plane (CP) and a gNB-CU-user plane (UP) of a gNB-CU.

305, the first access-network device determines that the second communication network associated with the cell is valid and controls the terminal device to perform cell handover, based on determination that a network parameter in the cell configuration information matches a corresponding network parameter in the validity configuration information.

In some implementations, the first access-network device determining that the network parameter in the cell configuration information matches the corresponding network parameter in the validity configuration information includes at least one of the following.

(1) Determine that the network parameter in the cell configuration information matches the corresponding network parameter in the validity configuration information, if frequency-band ID information in the cell configuration information is the same as at least one piece of frequency-band ID information in the validity configuration information.

(2) Determine that the network parameter in the cell configuration information matches the corresponding network parameter in the validity configuration information, if a TAI associated with the second communication network in the cell configuration information is the same as at least one TAI associated with the second communication network in the validity configuration information.

(3) Determine that the network parameter in the cell configuration information matches the corresponding network parameter in the validity configuration information, if frequency-point ID information in the cell configuration information is the same as at least one piece of frequency-point ID information in the validity configuration information.

(4) Determine that the network parameter in the cell configuration information matches the corresponding network parameter in the validity configuration information, if a CGI associated with the second communication network in the cell configuration information is the same as at least one CGI associated with the second communication network in the validity configuration information.

(5) Determine that the network parameter in the cell configuration information matches the corresponding network parameter in the validity configuration information, if RAT information in the cell configuration information or derived from the cell configuration information is the same as at least one piece of RAT information in the validity configuration information.

(6) Determine that the network parameter in the cell configuration information matches the corresponding network parameter in the validity configuration information, if core-network type information in the cell configuration information or derived from the cell configuration information is the same as at least one piece of core-network type information in the validity configuration information.

The process of determining matching in step 305 is similar to the process of determining matching in step 205 in the foregoing implementations, and thus will not be described again herein.

The first point to be explained is that in implementations of the disclosure, whether the second communication network is valid is determined exemplarily according to whether the cell configuration information matches the validity configuration information. In another implementation, if the validity configuration information includes geographic region information, the first access-network device will determine, according to a region indicated by current geographic location information of the terminal device, whether it is within a geographic region indicated by the geographic region information in the validity configuration information, thereby determining whether the second communication network is valid.

The second point to be explained is that in implementations of the disclosure, the access-network device controls the terminal device to perform cell handover exemplarily based on determination that the cell configuration information matches the validity configuration information. In another implementation, the terminal device is in a connected state and is connected to the first access-network device. If the first access-network device determines that cell configuration information of the second access-network device matches the validity configuration information, it indicates that a cell covered by the second access-network device can be accessed by the terminal device, and the first access-network device will control the terminal device to perform cell handover, so that the terminal device can access the cell covered by the second access-network device.

Implementations of the disclosure provide a method of configuring validity information of the second communication network equivalent to the first communication network registered. The access-network device determines, according to the validity information configured by the core-network device, whether the second communication network equivalent to the first communication network is valid, thereby controlling the terminal to perform cell handover. As such, it is possible to prevent random handover of the terminal between equivalent communication networks, thereby restricting permission of the terminal, expanding a sharing mode of communication networks, and on the other hand, improving flexibility of network sharing.

Figure 4:
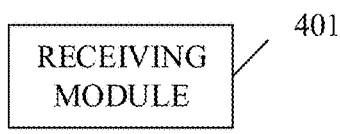
FIG. 4 is a block diagram of an information configuration apparatus provided in an exemplary implementation of the disclosure.

FIG. 4 is a block diagram of an information configuration apparatus provided in an exemplary implementation of the disclosure. The apparatus is applicable to a terminal device. Referring to FIG. 4, the apparatus includes a receiving module 401. The receiving module 401 is configured to receive network configuration information sent by a core-network device, where the network configuration information includes validity configuration information, and the validity configuration information indicates a validity condition of a second communication network equivalent to a first communication network registered by the terminal device.

In some implementations, the network configuration information further includes an ID of the first communication network registered by the terminal device.

In some implementations, the network configuration information further includes a list of equivalent communication networks associated with the first communication network, where the list of equivalent communication networks includes an ID of the second communication network equivalent to the first communication network.

In some implementations, the validity configuration information includes at least one of: frequency-band ID information, a TAI, frequency-point ID information, a CGI, geographic region information, RAT information, or core-network type information.

In some implementations, the validity configuration information is maintained by an NAS, or the validity configuration information is maintained by an AS and the NAS.

Figure 5:
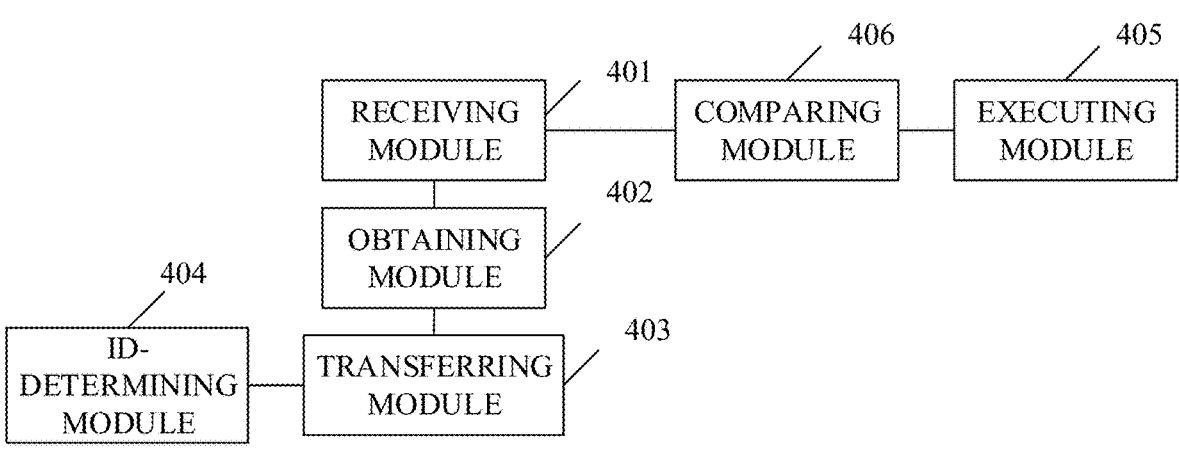
FIG. 5 is a block diagram of an information configuration apparatus provided in an exemplary implementation of the disclosure.

In some implementations, if the validity configuration information includes the geographic region information, referring to FIG. 5, the apparatus further includes an obtaining module 402 and a transferring module 403. The obtaining module 402 is configured to obtain, by an AS of the terminal device, current geographic location information of the terminal device. The transferring module 403 is configured to transfer, by the AS of the terminal device, the geographic location information to an NAS of the terminal device, where the NAS determines whether the geographic location information is within a geographic region indicated by the geographic region information.

In some implementations, referring to FIG. 5, the apparatus further includes an ID-determining module 404. The ID-determining module 404 is configured to query a location ID list according to the geographic location information, and determine a location ID corresponding to a geographic region that the geographic location information belongs to, where the location ID list includes a correspondence between location IDs and geographic regions. The transferring module 403 is configured to transfer the location ID to the NAS.

In some implementations, the network configuration information is contained in a registration response message or a configuration update message, where the registration response message is a response message replied by the core-network device in response to a registration request message sent by the terminal device, and the configuration update message is used for the core-network device to update a configuration of the terminal device.

In some implementations, the receiving module 401 is further configured to receive cell configuration information sent by an access-network device, where the cell configuration information is configuration information of a cell that is found or camped on by the terminal device. Referring to FIG. 5, the apparatus further includes an executing module 405. The executing module 405 is configured to determine that the second communication network associated with the cell is valid and perform cell selection or cell re-selection, based on determination that a network parameter in the cell configuration information matches a corresponding network parameter in the validity configuration information.

In some implementations, referring to FIG. 5, the apparatus further includes a comparing module 406. The comparing module 406 is configured to determine that the network parameter in the cell configuration information matches the corresponding network parameter in the validity configuration information, if frequency-band ID information in the cell configuration information is the same as at least one piece of frequency-band ID information in the validity configuration information; or determine that the network parameter in the cell configuration information matches the corresponding network parameter in the validity configuration information, if a TAI associated with the second communication network in the cell configuration information is the same as at least one TAI associated with the second communication network in the validity configuration information; or determine that the network parameter in the cell configuration information matches the corresponding network parameter in the validity configuration information, if frequency-point ID information in the cell configuration information is the same as at least one piece of frequency-point ID information in the validity configuration information; or determine that the network parameter in the cell configuration information matches the corresponding network parameter in the validity configuration information, if a CGI associated with the second communication network in the cell configuration information is the same as at least one CGI associated with the second communication network in the validity configuration information; or determine that the network parameter in the cell configuration information matches the corresponding network parameter in the validity configuration information, if RAT information in the cell configuration information or derived from the cell configuration information is the same as at least one piece of RAT information in the validity configuration information; or determine that the network parameter in the cell configuration information matches the corresponding network parameter in the validity configuration information, if core-network type information in the cell configuration information or derived from the cell configuration information is the same as at least one piece of core-network type information in the validity configuration information.

In some implementations, the receiving module 401 is configured to receive dedicated signaling or a system broadcast message sent by the access-network device, where the dedicated signaling or the system broadcast message contains the cell configuration information.

In some implementations, the cell configuration information includes at least one of: frequency-band ID information, a TAI, frequency-point ID information, a CGI, geographic region information, RAT information, or core-network type information.

In some implementations, the receiving module 401 is configured to receive, by an AS of the terminal device, the cell configuration information sent by the access-network device. The apparatus further includes the transferring module 403. The transferring module 403 is configured to transfer, by the AS of the terminal device, the cell configuration information to an NAS of the terminal device.

In some implementations, if the first communication network is a PLMN, the second communication network is a PLMN or an SNPN. Alternatively, if the first communication network is an SNPN, the second communication network is a PLMN or an SNPN.

Figure 6:
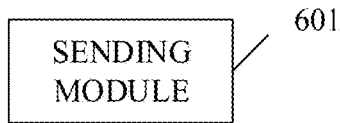
FIG. 6 is a block diagram of an information configuration apparatus provided in an exemplary implementation of the disclosure.

FIG. 6 is a block diagram of an information configuration apparatus provided in an exemplary implementation of the disclosure. The apparatus is applicable to a core-network device. Referring to FIG. 6, the apparatus includes a sending module 601. The sending module 601 is configured to send network configuration information to a terminal device, where the network configuration information includes validity configuration information, and the validity configuration information indicates a validity condition of a second communication network equivalent to a first communication network registered by the terminal device.

In some implementations, the network configuration information further includes an ID of the first communication network registered by the terminal device.

In some implementations, the network configuration information further includes a list of equivalent communication networks associated with the first communication network, where the list of equivalent communication networks includes an ID of the second communication network equivalent to the first communication network.

In some implementations, the validity configuration information includes at least one of: frequency-band ID information, a TAI, frequency-point ID information, a CGI, geographic region information, RAT information, or core-network type information.

In some implementations, the network configuration information is contained in a registration response message or a configuration update message, where the registration response message is a response message replied by the core-network device in response to a registration request message sent by the terminal device, and the configuration update message is used for the core-network device to update a configuration of the terminal device.

Figure 7:
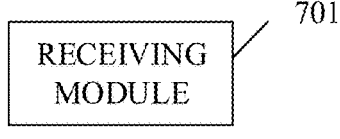
FIG. 7 is a block diagram of an information configuration apparatus provided in an exemplary implementation of the disclosure.

FIG. 7 is a block diagram of an information configuration apparatus provided in an exemplary implementation of the disclosure. The apparatus is applicable to a first access-network device. Referring to FIG. 7, the apparatus includes a receiving module 701. The receiving module 701 is configured to receive network configuration information sent by a core-network device, where the network configuration information includes validity configuration information, and the validity configuration information indicates a validity condition of a second communication network equivalent to a first communication network registered by a terminal device.

In some implementations, the network configuration information further includes an ID of the first communication network registered by the terminal device.

In some implementations, the network configuration information further includes a list of equivalent communication networks associated with the first communication network, where the list of equivalent communication networks includes an ID of the second communication network equivalent to the first communication network.

In some implementations, the validity configuration information includes at least one of: frequency-band ID information, a TAI, frequency-point ID information, a CGI, geographic region information, RAT information, or core-network type information.

Figure 8:
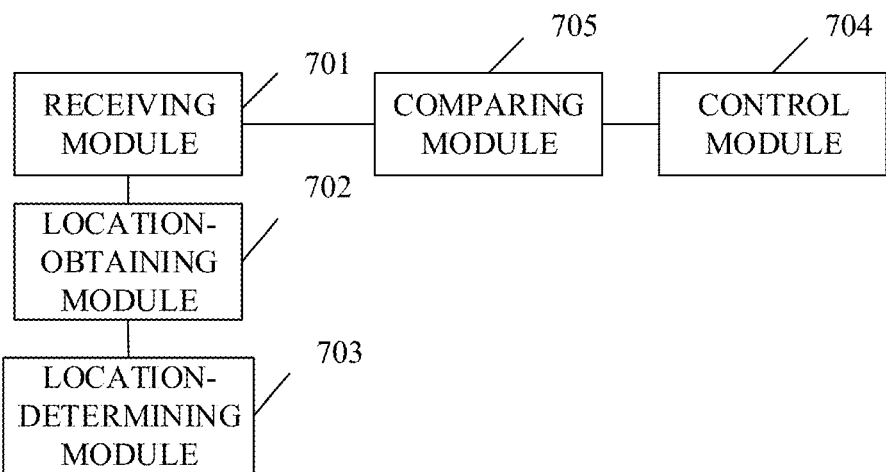
FIG. 8 is a block diagram of an information configuration apparatus provided in an exemplary implementation of the disclosure.

In some implementations, if the validity configuration information includes the geographic region information, referring to FIG. 8, the apparatus further includes a location-obtaining module 702 and a location-determining module 703. The location-obtaining module 702 is configured to obtain current geographic location information of the terminal device. The location-determining module 703 is a location-determining module configured to determine whether the geographic location information is within a geographic region indicated by the geographic region information.

In some implementations, the receiving module 701 is further configured to receive, via an interface message, cell configuration information sent by a second access-network device. Referring to FIG. 8, the apparatus further includes a control module 704. The control module 704 is configured to determine that the second communication network associated with the cell is valid and control the terminal device to perform cell handover, based on determination that a network parameter in the cell configuration information matches a corresponding network parameter in the validity configuration information.

In some implementations, referring to FIG. 8, the apparatus further includes a comparing module 705. The comparing module 705 is configured to determine that the network parameter in the cell configuration information matches the corresponding network parameter in the validity configuration information, if frequency-band ID information in the cell configuration information is the same as at least one piece of frequency-band ID information in the validity configuration information; or determine that the network parameter in the cell configuration information matches the corresponding network parameter in the validity configuration information, if a TAI associated with the second communication network in the cell configuration information is the same as at least one TAI associated with the second communication network in the validity configuration information; or determine that the network parameter in the cell configuration information matches the corresponding network parameter in the validity configuration information, if frequency-point ID information in the cell configuration information is the same as at least one piece of frequency-point ID information in the validity configuration information; or determine that the network parameter in the cell configuration information matches the corresponding network parameter in the validity configuration information, if a CGI associated with the second communication network in the cell configuration information is the same as at least one CGI associated with the second communication network in the validity configuration information; or determine that the network parameter in the cell configuration information matches the corresponding network parameter in the validity configuration information, if RAT information in the cell configuration information or derived from the cell configuration information is the same as at least one piece of RAT information in the validity configuration information; or determine that the network parameter in the cell configuration information matches the corresponding network parameter in the validity configuration information, if core-network type information in the cell configuration information or derived from the cell configuration information is the same as at least one piece of core-network type information in the validity configuration information.

In some implementations, the cell configuration information includes at least one of: frequency-band ID information, a TAI, frequency-point ID information, a CGI, geographic region information, RAT information, or core-network type information.

In some implementations, if the first communication network is a PLMN, the second communication network is a PLMN or an SNPN. Alternatively, if the first communication network is an SNPN, the second communication network is a PLMN or an SNPN.

In some implementations, the interface message is carried in at least one of: X2 interface, Xn interface, S1 interface, NG interface, F1 interface, or E1 interface.

Figure 9:
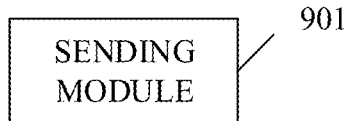
FIG. 9 is a block diagram of an information configuration apparatus provided in an exemplary implementation of the disclosure.

FIG. 9 is a block diagram of an information configuration apparatus provided in an exemplary implementation of the disclosure. The apparatus is applicable to a core-network device. Referring to FIG. 9, the apparatus includes a sending module 901. The sending module 901 is configured to send network configuration information to a first access-network device, where the network configuration information includes validity configuration information, and the validity configuration information indicates a validity condition of a second communication network equivalent to a first communication network registered by a terminal device.

In some implementations, the network configuration information further includes an ID of the first communication network registered by the terminal device.

In some implementations, the network configuration information further includes a list of equivalent communication networks associated with the first communication network, where the list of equivalent communication networks includes an ID of the second communication network equivalent to the first communication network.

In some implementations, the validity configuration information includes at least one of: frequency-band ID information, a TAI, frequency-point ID information, a CGI, geographic region information, RAT information, or core-network type information.

Figure 10:
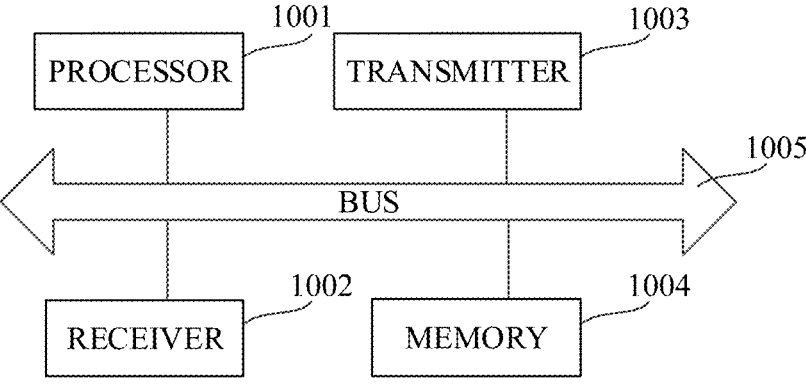
FIG. 10 is a schematic structural diagram of a communication device provided in an exemplary implementation of the disclosure.

Referring to FIG. 10, FIG. 10 is a schematic structural diagram of a communication device 100 provided in an exemplary implementation of the disclosure. The communication device includes a processor 1001, a receiver 1002, a transmitter 1003, a memory 1004, and a bus 1005.

The processor 1001 includes one or more processing cores. The processor 1001 performs various functional applications and information processing by running software programs and modules.

The receiver 1002 and the transmitter 1003 may be implemented as a communication assembly. The communication assembly may be a communication chip.

The memory 1004 is connected with the processor 1001 via the bus 1005.

The memory 1004 may be configured to store at least one program code, and the processor 101 is configured to execute the at least one program code to implement various steps in foregoing method implementations.

In addition, the communication device may be a terminal device, a core-network device, or an access-network device. The memory 1004 may be implemented by any type of volatile or nonvolatile storage devices or combinations thereof. The volatile or non-volatile storage devices include, but are not limited to: a magnetic disk or an optical disk, an electrically erasable programmable read-only memory (EEPROM), an EPROM, a static random-access memory (SRAM), a ROM, a magnetic memory, a flash memory, and a PROM.

Exemplary implementations of the disclosure further provide a computer-readable storage medium. The storage medium stores executable program codes. The executable program codes are loaded and executed by a processor to implement the method performed by the terminal device, the core-network device, or the access-network device provided in the foregoing method implementations.

Exemplary implementations of the disclosure further provide a chip. The chip includes a programmable logic circuit and/or program instructions. The chip, when run on the terminal device, the core-network device, or the access-network device, is configured to perform the foregoing method.

Exemplary implementations of the disclosure further provide a computer program product. The computer program product, when run on a processor of the terminal device, the core-network device, or the access-network device, is configured to perform the foregoing method.

The technical solutions provided in implementations of the disclosure at least have the following advantages.

In an aspect, implementations of the disclosure provide a method of configuring validity information of the second communication network equivalent to the first communication network registered. The access-network device determines, according to the validity information configured by the core-network device, whether the second communication network equivalent to the first communication network is valid, thereby controlling the terminal to perform cell handover. As such, it is possible to prevent random handover of the terminal between equivalent communication networks, thereby restricting permission of the terminal, expanding a sharing mode of communication networks, and on the other hand, improving flexibility of network sharing.

In another aspect, implementations of the disclosure provide a method for configuring validity information of the second communication network equivalent to the first communication network registered. The terminal determines, according to the validity information configured by the core-network device, whether the second communication network equivalent to the first communication network is valid, thereby controlling the terminal to perform cell selection or cell re-selection. As such, it is possible to prevent the terminal from randomly performing cell selection or cell re-selection between equivalent communication networks, thereby restricting permission of the terminal, expanding a sharing mode of communication networks, and on the other hand, improving flexibility of network sharing.

It will be understood by those of ordinary skill in the art that, all or some of the steps in the foregoing implementations may be accomplished by means of hardware, or a program to instruct associated hardware. The program may be stored in a computer-readable storage medium. The storage medium may be a ROM, a magnetic disk, or an optical disk, etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An information configuration method, applied to a terminal device and comprising:

receiving network configuration information sent by a core-network device, the network configuration information comprising validity configuration information, and wherein the validity configuration information comprises geographic region information, and the validity configuration information indicates a validity condition of a second communication network equivalent to a first communication network registered by the terminal device;

obtaining, by an access stratum (AS) of the terminal device, geographic location information of the terminal device;

transferring, by the AS of the terminal device, the geographic location information to a non-access stratum (NAS) of the terminal device, and determining, by the NAS, whether the geographic location information is within a geographic region indicated by the geographic region information; and querying a location ID list according to the geographic location information, and determining a location ID corresponding to a geographic region that the geographic location information belongs to, wherein the location ID list comprises a correspondence between location IDs and geographic regions;

wherein transferring the geographic location information to the NAS comprises: transferring the location ID to the NAS.

2. The method of claim 1, wherein:

the network configuration information further comprises one of:

an identity (ID) of the first communication network registered by the terminal device; and a list of equivalent communication networks associated with the first communication network; and the list of equivalent communication networks comprises an ID of the second communication network equivalent to the first communication network.

3. The method of claim 1, wherein the validity configuration information further comprises at least one of:

frequency-band ID information;

a tracking area identity (TAI);

frequency-point ID information;

a cell global identity (CGI);

radio access technology (RAT) information; and core-network type information.

4. The method of claim 1, wherein the validity configuration information is maintained by the NAS, or the validity configuration information is maintained by the AS and the NAS.

5. The method of claim 1, wherein the network configuration information is contained in a registration response message or a configuration update message;

wherein the registration response message is a response message replied by the core-network device in response to a registration request message sent by the terminal device, and the configuration update message is used for the core-network device to update a configuration of the terminal device.

6. The method of claim 1, further comprising:

receiving cell configuration information sent by an access-network device, wherein the cell configuration information is configuration information of a cell that is found or camped on by the terminal device; and determining that the second communication network associated with the cell is valid and performing cell selection or cell re-selection, based on determination that a network parameter in the cell configuration information matches a corresponding network parameter in the validity configuration information.

7. The method of claim 6, further comprising one of the following:

determining that the network parameter in the cell configuration information matches the corresponding network parameter in the validity configuration information, when frequency-band ID information in the cell configuration information is the same as at least one piece of frequency-band ID information in the validity configuration information;

determining that the network parameter in the cell configuration information matches the corresponding network parameter in the validity configuration information, when a TAI associated with the second communication network in the cell configuration information is the same as at least one TAI associated with the second communication network in the validity configuration information;

determining that the network parameter in the cell configuration information matches the corresponding network parameter in the validity configuration information, when frequency-point ID information in the cell configuration information is the same as at least one piece of frequency-point ID information in the validity configuration information;

determining that the network parameter in the cell configuration information matches the corresponding network parameter in the validity configuration information, when a CGI associated with the second communication network in the cell configuration information is the same as at least one CGI associated with the second communication network in the validity configuration information;

determining that the network parameter in the cell configuration information matches the corresponding network parameter in the validity configuration information, when RAT information in the cell configuration information or derived from the cell configuration information is the same as at least one piece of RAT information in the validity configuration information; and determining that the network parameter in the cell configuration information matches the corresponding network parameter in the validity configuration information, when core-network type information in the cell configuration information or derived from the cell configuration information is the same as at least one piece of core-network type information in the validity configuration information.

8. The method of claim 6, wherein receiving the cell configuration information sent by the access-network device comprises:

receiving dedicated signaling or a system broadcast message sent by the access-network device, wherein the dedicated signaling or the system broadcast message contains the cell configuration information.

9. The method of claim 6, wherein the cell configuration information comprises at least one of:

frequency-band ID information;

a tracking area identity (TAI);

frequency-point ID information;

a cell global identity (CGI);

geographic region information;

radio access technology (RAT) information; and core-network type information.

10. The method of claim 6, wherein receiving the cell configuration information sent by the access-network device comprises:

receiving, by the AS of the terminal device, the cell configuration information sent by the access-network device; and wherein the method further comprises:

transferring, by the AS of the terminal device, the cell configuration information to the NAS of the terminal device.

11. The method of claim 1, wherein one of the following:

when the first communication network is a public land mobile network (PLMN), the second communication network is a PLMN or a stand-alone non-public network (SNPN); and when the first communication network is an SNPN, the second communication network is a PLMN or an SNPN.

12. A terminal device, comprising:

a processor;

and a memory configured to store executable program codes of the processor, wherein the processor is configured to load and execute the executable program codes to cause the terminal device to:

receive network configuration information sent by a core-network device, the network configuration information comprising validity configuration information, and wherein the validity configuration information comprises geographic region information, and the validity configuration information indicates a validity condition of a second communication network equivalent to a first communication network registered by the terminal device;

obtain, by an access stratum (AS) of the terminal device, geographic location information of the terminal device;

transfer, by the AS of the terminal device, the geographic location information to a non-access stratum (NAS) of the terminal device, and determining, by the NAS, whether the geographic location information is within a geographic region indicated by the geographic region information; and query a location ID list according to the geographic location information, and determining a location ID corresponding to a geographic region that the geographic location information belongs to, wherein the location ID list comprises a correspondence between location IDs and geographic regions;

wherein the AS configured to transfer the geographic location information to the NAS is configured to:

transfer the location ID to the NAS.

13. The terminal device of claim 12, wherein:

the network configuration information further comprises one of:

an identity (ID) of the first communication network registered by the terminal device; and a list of equivalent communication networks associated with the first communication network; and the list of equivalent communication networks comprises an ID of the second communication network equivalent to the first communication network.

14. The terminal device of claim 12, wherein the validity configuration information further comprises at least one of:

frequency-band ID information;

a tracking area identity (TAI);

frequency-point ID information;

a cell global identity (CGI);

radio access technology (RAT) information; and core-network type information.

15. The terminal device of claim 12, wherein the validity configuration information is maintained by the NAS, or the validity configuration information is maintained by the AS and the NAS.

16. The terminal device of claim 12, wherein the network configuration information is contained in a registration response message or a configuration update message;

wherein the registration response message is a response message replied by the core-network device in response to a registration request message sent by the terminal device, and the configuration update message is used for the core-network device to update a configuration of the terminal device.

17. The terminal device of claim 12, wherein the terminal device is further configured to:

receive cell configuration information sent by an access-network device, wherein the cell configuration information is configuration information of a cell that is found or camped on by the terminal device; and determine that the second communication network associated with the cell is valid and performing cell selection or cell re-selection, based on determination that a network parameter in the cell configuration information matches a corresponding network parameter in the validity configuration information.

18. The terminal device of claim 17, wherein the terminal device configured to receive the cell configuration information sent by the access-network device is configured to:

receive dedicated signaling or a system broadcast message sent by the access-network device, wherein the dedicated signaling or the system broadcast message contains the cell configuration information.

19. The terminal device of claim 17, wherein the cell configuration information comprises at least one of:

frequency-band ID information;

a tracking area identity (TAI);

frequency-point ID information;

a cell global identity (CGI);

geographic region information;

radio access technology (RAT) information; and core-network type information.

20. The terminal device of claim 17, wherein the terminal device caused to receive the cell configuration information sent by the access-network device is configured to:

receive, by the AS of the terminal device, the cell configuration information sent by the access-network device; and the terminal device is further caused to:

transfer, by the AS of the terminal device, the cell configuration information to the NAS of the terminal device.

* * * * *